US012467169B2

(12) United States Patent
Gregorich et al.

(10) Patent No.: US 12,467,169 B2
(45) Date of Patent: Nov. 11, 2025

(54) NONWOVEN MATERIAL, USE OF THE NONWOVEN MATERIAL, AND WIPING CLOTH, DRYER SHEET AND FACE MASK CONTAINING THE NONWOVEN MATERIAL

(71) Applicant: LENZING AKTIENGESELLSCHAFT, Lenzing (AT)

(72) Inventors: Katharina Gregorich, Altmunster (AT); Mirko Einzmann, Wels (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 0 days.

(21) Appl. No.: 18/387,303

(22) Filed: Nov. 6, 2023

(65) Prior Publication Data
US 2024/0068140 A1 Feb. 29, 2024

Related U.S. Application Data

(63) Continuation of application No. 17/263,314, filed as application No. PCT/EP2019/070035 on Jul. 25, 2019, now abandoned.

(30) Foreign Application Priority Data

Jul. 31, 2018 (EP) .................................... 18186541

(51) Int. Cl.
*D04H 1/4258* (2012.01)
*A45D 44/00* (2006.01)
(Continued)

(52) U.S. Cl.
CPC ......... *D04H 1/4258* (2013.01); *A45D 44/002* (2013.01); *D01D 5/14* (2013.01);
(Continued)

(58) Field of Classification Search
CPC ........ D04H 1/4258; D04H 3/013; D04H 3/02; D04H 3/045; D01F 2/00; D01F 2/06;
(Continued)

(56) References Cited

U.S. PATENT DOCUMENTS

| 3,666,545 | A | 5/1972 | Pinatel et al. |
| 5,023,130 | A | 6/1991 | Simpson et al. |

(Continued)

FOREIGN PATENT DOCUMENTS

| CN | 104556966 A | 4/2015 |
| CN | 107460787 A | 12/2017 |

(Continued)

OTHER PUBLICATIONS

Asahi Kasei, "What is Bemliese?," downloaded from https://url.usb.m.mimecastprotect.com/s/8dfpCDwO2IF5rYnQSWfkhjhYGg?domain=asahi-kasei.co.jp/.

(Continued)

*Primary Examiner* — Elizabeth M Imani
(74) *Attorney, Agent, or Firm* — Venable LLP

(57) ABSTRACT

The invention relates to a nonwoven as well as to a wipe, a face mask, and a dryer sheet including the nonwoven, which includes a network of molded bodies, the nonwoven, in the dry state, having a specific opacity of greater than or equal to 1.0%·m²/g. In order to create a nonwoven of low basis weight, which is easy to produce and has, without special modifications, a high specific opacity, it is proposed that the molded bodies are regenerated cellulosic molded bodies and are materially interconnected via node points to form the network, and the regenerated cellulosic molded bodies comprising monofilament sections extending between node points, whose diameter varies along their lengthwise extension and which have a diameter of less than or equal to 15 μm for at least 90% of their lengthwise extension.

32 Claims, 7 Drawing Sheets

(51) Int. Cl.
  *D01D 5/14* (2006.01)
  *D01D 5/20* (2006.01)
  *D01F 2/06* (2006.01)
  *D04H 3/013* (2012.01)

(52) U.S. Cl.
  CPC ............... *D01D 5/20* (2013.01); *D01F 2/06* (2013.01); *D04H 3/013* (2013.01); *A45D 2200/1027* (2013.01); *D10B 2501/04* (2013.01); *D10B 2503/00* (2013.01); *D10B 2509/026* (2013.01)

(58) Field of Classification Search
  CPC ......... A45D 44/002; A45D 2200/1027; D01D 5/14; D01D 5/20; D10B 2501/04; D10B 2503/00; D10B 2509/026
  See application file for complete search history.

(56) References Cited

U.S. PATENT DOCUMENTS

| | | | |
|---|---|---|---|
| 5,725,821 | A | 3/1998 | Gannon et al. |
| 6,197,230 | B1 | 3/2001 | Pierre et al. |
| 6,210,801 | B1 | 4/2001 | Luo et al. |
| 6,358,461 | B1 * | 3/2002 | Law .................. D04H 3/16 425/72.2 |
| 7,067,444 | B2 | 6/2006 | Luo et al. |
| 7,922,943 | B2 | 4/2011 | Gerking |
| 8,012,565 | B2 | 9/2011 | Luo |
| 8,282,877 | B2 | 10/2012 | White et al. |
| 9,890,487 | B2 | 2/2018 | Ochiai et al. |
| 10,639,212 | B2 | 5/2020 | Kanya et al. |
| 2002/0148050 | A1 * | 10/2002 | Luo .................. D01D 5/098 8/115.51 |
| 2002/0168906 | A1 * | 11/2002 | Schlossnikl ............. B29C 48/05 28/140 |
| 2004/0099981 | A1 | 5/2004 | Gerking |
| 2004/0170836 | A1 | 9/2004 | Bond et al. |
| 2005/0056956 | A1 | 3/2005 | Zhao et al. |
| 2005/0227564 | A1 | 10/2005 | Bond et al. |
| 2008/0032579 | A1 | 2/2008 | Abed et al. |
| 2009/0186189 | A1 | 7/2009 | White et al. |
| 2009/0246447 | A1 | 10/2009 | Luo |
| 2009/0324926 | A1 | 12/2009 | Luo |
| 2010/0062671 | A1 | 3/2010 | Child et al. |
| 2017/0360622 | A1 | 12/2017 | Kanya et al. |
| 2020/0164616 | A1 * | 5/2020 | Carlyle .................. B32B 7/02 |

FOREIGN PATENT DOCUMENTS

| | | |
|---|---|---|
| DE | 102006035361 A1 | 4/2008 |
| EP | 0473325 A1 | 3/1992 |
| EP | 1 358 369 B1 | 8/2004 |
| EP | 2 860 307 A1 | 4/2015 |
| EP | 2 013 390 B1 | 8/2015 |
| WO | 95/35400 A1 | 12/1995 |
| WO | 97/01660 A1 | 1/1997 |
| WO | 98/07911 A1 | 2/1998 |
| WO | 98/26122 A1 | 6/1998 |
| WO | 99/47733 A1 | 9/1999 |
| WO | 99/64649 A1 | 12/1999 |
| WO | 2004/063434 A1 | 7/2004 |
| WO | 05/106085 A1 | 11/2005 |
| WO | 2005/108665 A1 | 11/2005 |
| WO | 2006/133037 A1 | 12/2006 |
| WO | 2010/028238 A1 | 3/2010 |
| WO | 2013/187404 A1 | 12/2013 |

OTHER PUBLICATIONS

Hayhurst, J., "Spunbond Cellulose," Chemical Fibers International, vol. 56, No. 6, pp. 386-392 (2006).

* cited by examiner

NONWOVEN MATERIAL, USE OF THE NONWOVEN MATERIAL, AND WIPING CLOTH, DRYER SHEET AND FACE MASK CONTAINING THE NONWOVEN MATERIAL

CROSS REFERENCE TO RELATED APPLICATIONS

This application is a continuation of U.S. patent application Ser. No. 17/263,314, now abandoned filed on Jan. 26, 2021, which is a national-stage entry under 35 U.S.C. § 371 of International Patent Application No. PCT/EP2019/070035, published as WO 2020/025440 A1, filed Jul. 25, 2019, which claims priority to EP 18186541.1, filed Jul. 31, 2018, the entire disclosure of each of which is hereby incorporated by reference.

FIELD OF THE INVENTION

The invention relates to a nonwoven, including a network of molded bodies, the nonwoven, in the dry state, having a specific opacity greater than or equal to $1.0\% \cdot m^2/g$. Furthermore, the invention relates to uses of the nonwoven and to a wipe, a dryer sheet, and a face mask containing the nonwoven.

BACKGROUND OF THE INVENTION

Nonwovens are employed in a wide variety of applications. In view of the unique properties and low production costs, they constitute an ideal substrate for disposable or single-use products in hygiene applications such as wipes, wet wipes, face masks, diapers, and others. Especially in the field of wipe applications, customers require products that feature high opacity, sufficient mechanical strength, flexibility, thickness, and high water absorption. High opacity, in particular, is of great importance to end customers, as nonwoven products having insufficient opacity tend to be associated with low tear resistance and low reliability. At the same time, however, the demand for products of low basis weight is rising steadily. In this connection, high opacity can enable the further reduction of basis weights, while still conveying the feeling of tear resistance and reliability to the end customer.

Although in most cases nonwovens of high basis weight also feature high opacity, the production of nonwovens of low basis weight, especially in the range below about 35 $g/m^2$, and also of high opacity poses huge challenges for manufacturers.

Simple hydroentangled nonwovens (as known from EP 0473325 A1) of low basis weights can only be produced with great effort and will subsequently exhibit a highly irregular structure and thus also highly irregular opacity. In the case of low basis weights, it is often impossible to give them the necessary or desired opacity without adequate modifications and additives.

For example, it is known from prior art (US 2017/0360622 A1, CN 107460787 A, CN 104556966 A) to increase the opacity of a nonwoven by adding a matting agent such as titanium dioxide or zinc oxide. However, such matting agents are costly and significantly reduce the strength and flexibility of the fibers. In addition, an increased effort in terms of process technology is required for incorporating these substances in the fibers.

Furthermore, spunbonded fabrics are, for example, known from prior art (U.S. Pat. No. 3,666,545 A, WO 2010/028238 A1), which are produced from thermoplastic synthetic polymers in a meltblown or spunbond process. However, nonwovens including such a spunbonded fabric require a multilayer structure in order to be able to meet the requirements in terms of strength and stability. Here, the various layers of different nonwovens are bonded or fused to one another and provided with an additional coating, respectively, in order to obtain the desired opacity of the nonwoven. However, due to the synthetic polymer filaments, such nonwovens generally have a low water absorption capacity, and, due to the multilayer or coated layer structure, low flexibility. In addition, nonwovens including synthetic polymers are not biodegradable, which is why their use in disposable or single-use products should be avoided.

Another way to increase opacity in nonwovens known from prior art (WO 2006/133037 A1, WO 2004/063434 A1) is the use of cross-section-modified fibers. For example, it is known to extrude the fibers through a specially shaped nozzle and thus to obtain fibers of modified cross-section such as hollow fibers. While such fibers have increased opacity as compared to fibers having a solid, rounded cross-section, their production is complex in terms of process technology and thus costly. In addition, such fibers exhibit reduced water absorption when synthetic polymers are used.

The nonwovens according to the invention can be produced according to a method for the direct production of nonwovens from a cellulose-containing spinning solution.

Such methods are known, for example, from prior art (WO 98/26122 A1, WO 99/47733 A1, WO 98/07911 A1, WO 97/01660 A1, WO 99/64649 A1, WO 05/106085 A1, EP 1 358 369 A1, and EP 2 013 390 A1).

The preparation and extrusion of the spinning solution in such a method preferably takes place according to a direct dissolving process such as the lyocell process. In it, cellulose is dissolved directly in an aqueous solution of an amine oxide (preferably NMMO—N-methylmorpholine-N-oxide) and formed into a spinnable spinning solution. Then, the spinning solution is extruded through suitable spinnerets, and the cellulose dissolved in the extruded spinning solution is precipitated by using a coagulant in order to form molded bodies. In the case of an amine oxide, water or a mixture of water and amine oxide is particularly suitable as coagulant. The preparation of such spinning solutions according to the lyocell process for the production of nonwovens is known, for example, from WO 98/26122 A1, U.S. Pat. No. 7,067,444 B2, or U.S. Pat. No. 8,012,565 B1.

DISCLOSURE OF THE INVENTION

It is therefore the object of the invention to provide a nonwoven of low basis weight that is easy to produce and has high specific opacity without special modifications.

The invention solves the defined object in that the molded bodies are regenerated cellulosic molded bodies and are materially interconnected via node points to form the network, and the regenerated cellulosic molded bodies comprising monofilament sections extending between node points, whose diameter varies along their lengthwise extension and which have a diameter of less than or equal to 15 µm for at least 90% of their lengthwise extension.

If the molded bodies are regenerated cellulosic molded bodies, then biodegradable nonwovens can be created which, in addition, can be produced cost-effectively in a simple and reliable process. If the molded bodies are, in addition, materially interconnected via node points to form the network, then a particularly dimensionally stable nonwoven can be created which provides high tear resistance in combination with low basis weight. Advantageously, the opacity of the nonwoven can furthermore be increased significantly if the regenerated cellulosic molded bodies comprise monofilament sections extending between node points, whose diameter varies along their lengthwise extension and which have a diameter of less than or equal to 15 µm for at least 90% of their lengthwise extension. In fact, the monofilament sections of varying diameter are, due to their irregular surface, able to provide for particularly high and advantageous light scattering and thus increase the opacity of the entire nonwoven. With the monofilament sections of fine diameters it is possible, as set forth hereinabove, to ensure a particularly high area coverage with a high number of filaments per area, which in turn is conducive to a homogeneous opacity of the nonwoven. In addition, the very fine diameters of less than or equal to 15 µm permit an increase in volume and thus a reduction of the basis weight without losses in opacity. This way, it is possible to create a nonwoven of low basis weight and with a specific opacity of greater than or equal to 1.0%·m²/g.

Furthermore, it is mentioned in this connection that due to the nature of the production method the formation of lone monofilament sections having diameters greater than 15 µm is unavoidable. However, such outliers have no negative impact whatsoever on the advantageous characteristics of the nonwovens according to the invention as long as the monofilament sections have a diameter of less than or equal to 15 µm for at least 90% of their lengthwise extension. In other advantageous configurations of the invention, the monofilament sections can also have a diameter of less than or equal to 15 µm for at least 95% of their lengthwise extension.

In general, it is noted that "material connection" between the molded bodies in the nonwoven denotes a cohesive connection between the cellulose molecules of the regenerated cellulosic molded bodies. Such a connection can be obtained particularly through contact between, or by bringing into contact, not yet fully coagulated molded bodies (or of extruded spinning solution) after their extrusion, in which case the cellulose molecules form the material connection via cohesion.

In general, it is mentioned that "opacity" of the nonwoven denotes the degree of non-transparency or imperviousness to light. Such opacity is usually determined by measuring the light transmittance of the nonwoven, wherein opacity [%]=100%−light transmittance [%].

Here, the specific opacity of the nonwoven is defined according to Formula (1) as the opacity [%] normalized per basis weight [g/m²]:

$$\text{specific opacity } [\%\cdot m^2/g] = \text{opacity } [\%]/\text{basis weight } [g/m^2]. \quad (1)$$

By determining the specific opacity, the effect of the opacity increasing with increasing basis weight can be normalized.

In general, it is also mentioned that the opacity of the nonwoven is always determined in the dry state at a natural moisture content after conditioning for 24 hours at 23° C. (±2° C.) and 50% (±5%) relative air humidity.

Furthermore, a nonwoven of the above-mentioned type can advantageously be improved in terms of its characteristics if the regenerated cellulosic molded bodies comprise multifilament sections extending between node points and consisting of several materially interconnected and essentially parallel monofilament sections. In fact, the monofilaments connected into the multifilament can thus contribute toward stabilizing the nonwoven and increase its strength. If, in addition, the multifilament sections have a diameter of less than or equal to 100 µm for at least 90% of their lengthwise extension, it can also be ensured that the nonwoven has a homogeneous appearance essentially without undesired visible thickened portions. Thus, a network of molded bodies can be created in the nonwoven, which includes both thicker multifilament sections for structure and strength and thinner monofilament sections for increasing opacity. Such a network can, in this connection, have an essentially multimodal distribution of the molded body diameters. The multifilament sections can, in this connection, be formed of two or more monofilaments following the extrusion of the molded bodies. In this process, the not yet fully coagulated molded bodies are in contact and form permanent material connections due to cohesion. Hence, the multifilament sections are not bundles of monofilaments but rather chemically and physically inseparably connected units.

If, in this process, the regenerated cellulosic molded bodies form an essentially endless network without visible filament ends, then a nonwoven can be provided which exhibits less abrasion and is also able to form a better contact face. Hence, contact with skin, for example, or with a surface can be improved.

Furthermore, the invention proves particularly advantageous if the nonwoven is essentially free of matting agents and colorants. In fact, the use of conventional matting agents such as titanium dioxide or zinc oxide requires very special processing conditions in the production of the molded bodies, as these agents, due to their very pronounced affinity to form particles, are very difficult to disperse in a spinning solution. In addition, the matting agent particles create discontinuities in the molded bodies, which can lead to increased brittleness and reduced strength in the molded body. This again poses a problem for the downstream processing industry, as the reduced strength and the higher brittleness, respectively, make complex and costly processing steps necessary. Furthermore, matting agents are costly and have a negative impact on the cost-efficiency of the nonwoven production. For this reason, it is another object of the invention to provide a nonwoven having high opacity without the use of matting agents and other colorants. Surprisingly, it was found, in this connection, that nonwovens according to the invention having a network of regenerated cellulosic molded bodies, including monofilament sections having a diameter of less than or equal to 15 µm for at least 90% of their lengthwise extension, have very high specific opacity without the use of matting agents. Therefore, it is possible to provide nonwovens that are cost-effective and easy to produce.

According to the invention, the nonwoven can preferably essentially consist only of cellulose. Such a nonwoven can prove advantageous, particularly over synthetic-polymer-based nonwovens, due to good biodegradability which is of key importance for the sustainable use in disposable or single-use products such as hygiene articles. In addition, compared to synthetic polymers, purely cellulosic products have a markedly increased water absorption capacity which is needed, for example, in hygiene articles. This way, it is possible to create a nonwoven having a particularly small ecologic footprint.

The afore-mentioned advantages can still be improved on if the regenerated cellulosic molded bodies are solution-spun cellulosic molded bodies. Solution-spun molded bodies denote molded bodies formed by extruding a spinning solution through spinnerets and subsequent coagulation, the spinning solution being prepared by direct dissolving of cellulose in a solvent (without previous chemical conversion of the cellulose). Preferably, the molded bodies are, in this connection, produced according to a lyocell process, with NMMO (N-methylmorpholine-N-oxide) being used as the solvent. Compared to other regenerated cellulosic molded bodies (such as viscose), solution-spun cellulosic molded bodies advantageously exhibit, for example, increased strength. Particularly in the case of lyocell molded bodies, these advantages can be achieved by an eco-friendly and cost-efficient method.

The characteristics of the nonwoven as regards water absorption and strength can still be improved on if the monofilament sections have a solid, particularly a rounded, cross-section.

Furthermore, it has surprisingly been found that a nonwoven of very high specific opacity can be provided if the nonwoven is essentially free of binders or adhesives. Unlike nonwovens that are produced in layer structures bonded together by binders or adhesives, the nonwovens according to the invention can do without the use of such substances. Particularly in the case of nonwovens used directly on skin and in sensitive locations, respectively, it is of key importance that these nonwovens are free of substances that are potentially able to cause skin irritations or allergic reactions. Adhesives and binders, in particular, are known to be capable of leading to such irritations or allergic reactions and should therefore be avoided in cases of contact with skin. According to the invention, it is therefore possible to create a skin-friendly nonwoven of low irritation and allergy potential and which does not suffer any losses in terms of opacity.

In addition, if the nonwoven is essentially free of copper and/or nickel, the afore-mentioned advantages as regards a low irritation and allergy potential can still be improved on, as even small residues of metals like copper or nickel are known to be able to lead to intolerance reactions. Particularly, the nonwoven has, in this connection, a copper content of less than 5 ppm and/or a nickel content of less than 2 ppm in order to minimize the risk of irritations.

The specific opacity of the nonwoven can still be improved on if the monofilament sections have a diameter of less than or equal to 10 µm, particularly of less than or equal to 7 µm, for at least 90% of their lengthwise extension. Due to the very fine diameters of the monofilament sections of less than or equal to 10 µm, or, in another preferred embodiment, of less than or equal to 7 µm, a particularly advantageous increase in volume and a concomitant reduction of the basis weight can be achieved without reducing the specific opacity of the nonwoven.

The afore-mentioned advantages can still be improved on if the monofilament sections have an average diameter of greater than or equal to 1 µm and less than or equal to 8 µm. This creates a narrow diameter distribution of the monofilament sections, which can guarantee a constantly high specific opacity, on the one hand, and ensures high stability and strength in the nonwoven, on the other.

For example, if the nonwoven has the inventively preferred diameters of the monofilament sections, then it can have a specific opacity of greater than or equal to $1.2\% \cdot m^2/g$ or, in a particularly advantageous embodiment, of greater than or equal to $1.5\% \cdot m^2/g$. Nonwovens having such a high specific opacity can attain excellent opacity already at very low basis weights.

In this connection, the invention can prove particularly advantageous if the nonwoven has a basis weight of less than or equal to 70 $g/m^2$. In another advantageous embodiment, the nonwoven has a basis weight of less than or equal to 35 $g/m^2$, more preferably of less than or equal to 20 $g/m^2$. This way, a particularly lightweight and fine nonwoven featuring excellent opacity can be created.

In addition, the nonwoven may prove advantageous if it includes property-refining and surface-refining or property-changing and surface-changing substances or processing-facilitating agents at a content of no more than 1% by weight, particularly of no more than 0.5% by weight. Such agents can be, for example, softening finishes, antistatic finishes, hydrophobic finishes, or finishes entering into interactions with lotions and thereby facilitating, for example, the release of an active agent. Such finishes can be selected, for example, from the group containing: fatty alcohol ether sulfates, phosphoric acid esters, alkyl ketene dimer, alkenyl succinic anhydride, aminopolysiloxane, esterquats, fatty acid polyglycol esters, aluminum sulfate, glycidyl ether, or substances of a similar type and acting in a similar manner, respectively.

The nonwoven according to the preferred embodiment variants of the invention can be particularly advantageous for use in numerous applications. For example, the high specific opacity at a low basis weight can prove particularly advantageous when using the nonwoven in one of the following products or in one of the following applications:

wipes (for example, for babies, kitchens, cosmetics, hygiene, cleaning, polishing, dust, industry, cleaning mops, etc.), filters (for example, air filters, HVAC, air conditioners, coffee filters, tea filters, filter bags, food filters, cigarette filters, oil filters, filter cartridges, vacuum cleaner bags, dust filters, hydraulic filters, kitchen filters, HEVAC/HEPA/ULPA filters, protective respiratory masks, etc.), absorbent hygiene products (such as absorbent layers, diapers, sanitary napkins, panty liners, incontinence products, tampons, towels, sanitary pads, rinseable products, pads, nursing pads, disposable underwear, training pants, make-up remover pads, washcloths, etc.), medical applications (for example, in disposable caps, gowns, masks, and overshoes, wound care, sterile packaging, coverstock, dressing material, disposable clothes, nasal strips, disposable underwear, bed sheets, transdermal drug delivery, shrouds, underlays, treatment packs, heat packs, ostomy bags, fixation tapes, incubator mattresses, mattress covers, etc.), geotextiles (for example, in plant protection covers, asphalt overlays, ground stabilization, impregnation layers, trench linings, plant covers, weed control mats, greenhouse shading, etc.), clothing (for example, nonwoven interlining, clothing insulation and protection, handbag components, shoe components, belt inlays, industrial headwear/shoes, disposable work clothes, bags for clothes and shoes, thermal insulation, etc.), buildings (for example, roofing, heat and sound insulation, house wrap, roofing felt, noise protection, reinforcement, sealing material, damping material, etc.), automotive (for example, in cabin filters, trunk linings, rear shelves, heat shields, trunk floor coverings, filters, roofliners, decorative materials, airbags, muffler underlays, insulation materials, vehicle covers, underlays, floor mats, tapes, tufted carpets, seat covers, door lining, charmeuse, etc.), furnishings (for example, furniture construction, insulators to arms and backs, pillow filling materials, dust covers, claddings, edge trims, bedding constructions, quilts, spring wrap, mattress components, mattress protectors, window curtains, wall coverings, carpet underlays, lampshades, seals, pillow filling material, mattress filling material, disposable bedspreads, curtains, etc.), industry (for example, for cable insulation, insulating tapes, sound-insulating layers, air-conditioning systems, battery separators, stain removers, food packages, adhesive tapes, sausage casings, cheese casings, artificial leather, paper making felt, packages in general, etc.), leisure and travel (sleeping bags, tents, baggage, hand bags, shopping bags, aircraft seat headrests, CD protectors, pillowcases, sandwich packages, etc.), school and office (for example, book covers, envelopes, maps, signs and pennants, flags, banknotes, etc.).

In addition, the invention can prove advantageous in a wipe, a face mask, and a dryer sheet that include a nonwoven as claimed in one of claims 1 to 16. Such a wipe, face mask, or dryer sheet can prove advantageous through an excellent specific opacity of greater than or equal to $1.0\%\cdot m^2/g$, and, in another embodiment, of greater than or equal to $1.2\%\cdot m^2/g$, and, in a very advantageous embodiment, of greater than or equal to $1.5\%\cdot m^2/g$. In addition, such wipes, face masks, and dryer sheets can have a basis weight of less than or equal to 70 g/m$^2$, and, in another advantageous embodiment, of less than or equal to 35 g/m$^2$, particularly less than or equal to 20 g/m$^2$, and thus provide a product of high opacity and low basis weight.

Such a wipe can prove advantageous for a variety of different applications, for example, in the hygiene, medical, or sanitary fields, and convey to the user a feeling of high reliability in terms of strength and water absorption capacity. A low basis weight can also be particularly suitable for sensitive applications such as the cleaning of measuring instruments or optical instruments such as eyeglasses, lenses, or binoculars.

An above-described face mask can, for example, be advantageous for hygienic applications, the low basis weight being able to provide for excellent flexibility and adaptability of the face mask to the contours of the user's face, and the high specific opacity being able to provide for a versatile, nontransparent substrate for a variety of active agents, for example, for the cosmetic treatment of the facial skin.

Such a dryer sheet according to the invention can be suited for use in laundry dryers and, due to the high specific opacity, is able to convey a high degree of reliability.

The afore-mentioned advantages of the wipes, face masks, or dryer sheets according to the invention can still be improved on if the nonwoven is impregnated with a lotion. In fact, such a lotion can contain active agents for various applications and thus provide for a product that is easy to use. For example, a wipe or face mask can thus come impregnated with a cleansing or care lotion that can be applied directly to the skin or to surfaces. A dryer sheet can, for example, come impregnated with a lotion that is released during the drying process and conditions the laundry.

Advantageously, an afore-mentioned lotion is essentially not water-based. This is because the water contained in a water-based lotion will be absorbed by the nonwoven and can significantly reduce the specific opacity as compared to the dry state. A preferred lotion can, for example, be fat-based or wax-based and thus guarantee a dry product of high specific opacity. Such wax-based lotion in a wipe can, for example, be present in the form of a polish which, during the polishing process, is released onto a surface. In the case of a fat-based lotion in a face mask, the lotion can, for example, melt due to the body temperature upon contact with the skin and thus be released to the skin. In the case of a dryer sheet, a laundry care agent can, for example, be present in the form of a wax-based lotion which, during the drying process, is released to the laundry due to an increase in temperature.

For the production of the nonwovens according to the invention, a method mentioned at the outset for the direct production of nonwovens from a cellulose-containing spinning solution can be used. In this connection, the spinning solution is preferably prepared according to a direct dissolving process, particularly the lyocell process, and extruded through spinnerets. The solvent used is particularly an aqueous solution of NMMO or another amine oxide. For the precipitation of the cellulose and the formation of the molded bodies after the extrusion of the spinning dope, particularly water is used as the coagulant.

In the method for the production of the nonwovens according to the invention, essentially, the following steps are performed:

a) preparation of a cellulose-containing spinning solution, particularly according to a direct dissolving process, b) extrusion of the spinning solution through at least one spinneret with closely adjacent nozzle holes, c) stretching and contacting the extruded spinning solution with the help of air streams at high velocities, d) formation of the nonwoven on a moving surface, particularly a belt conveyor or a drum, e) washing the nonwoven, and f) drying the washed nonwoven, wherein in steps c) and/or d) a coagulant is applied to the extruded spinning solution so as to precipitate at least partially the cellulose dissolved in the spinning solution. If the spinning solution is prepared according to a lyocell process, then the coagulant is preferably water or water with NMMO.

During steps c) and d) regenerated cellulosic molded bodies are formed thereby that are interconnected to form a network of molded bodies. In this connection, the shape and geometry of the formed molded bodies can be controlled to a great extent via the process parameters such as quantity and time of application of the coagulation liquid as well as velocity of the (blown) air stream. In addition, the formation of material connections between individual filaments of the extruded spinning solution is strongly influenced by the time of the application of the coagulation liquid. It has been found, for example, that, as compared to former methods, the early application of coagulation liquid, in the vicinity of the spinneret, suppresses the formation of multifilaments and causes a high content of monofilaments to be obtained in the final product. By contrast, if the coagulation of the molded bodies takes place at a later time, that is, away from the spinneret, filaments of the extruded spinning solution can contact one another in the blown air stream and be materially connected into a multifilament, as the cellulose has not yet been precipitated and thus a permanent connection, which, for example, can no longer be detached in a non-destructive manner, is created by cohesion between the cellulose molecules of the individual filaments. This cohesion is possible, in particular, if the filaments from extruded spinning solution still contain solvent and have not yet definitively coagulated. Then, the individual filaments and the formed multifilaments can intersect and contact one another in the blown air stream or during the formation of the nonwoven in step d) and thus create node points between the filaments. The individual filament sections will then be materially interconnected via the node points and, in this way, form the network of molded bodies that distinguishes the nonwoven according to the invention. Apart from the material connection in node points, the filaments can also intersect and overlap one another without forming a node point and thus form a three-dimensional network of molded bodies.

Due to increased stretching of the extruded spinning solution in the blown air stream, firstly, finer filaments can be formed, and secondly, the cellulose chains in the filament can be oriented more in the direction of the air stream. In addition, it has been found that a higher air pressure, or a higher velocity of the air stream, causes greater turbulence in the blown air stream. However, such greater turbulence can create filaments of varying diameter, as the extruded spinning dope has not yet been precipitated at the time stretching by the blown air stream and is therefore still moldable. The monofilaments and multifilaments or filament sections produced in this way can therefore have a diameter that varies along their lengthwise extension. In addition, the faster blown air stream generally leads to a reduction of the average diameters of the monofilaments. Both the production of finer monofilaments of a smaller diameter and the variation of the diameters along the lengthwise extension ultimately lead to an increase in the specific opacity of the nonwoven.

Apart from the velocity of the blown air stream and the quantity of coagulant applied, it is also possible to vary the take-off velocity of the nonwoven at the belt conveyor or the drum and thus influence the basis weight of the nonwoven. Surprisingly, it has been found that by increasing the take-off velocity it is possible to increase the area-related production output, on the one hand, and obtain a nonwoven of low basis weight and high specific opacity, on the other. The latter is mainly due to the monofilament sections in the nonwoven, which, for 90% of their lengthwise extension, have a diameter of less than or equal to 15 µm. Thus, the method can be used to produce a cost-effective nonwoven featuring particularly advantageous characteristics in terms of opacity.

By connecting several spinnerets in series in the method, it is also possible to create multilayer nonwovens, the networks of regenerated cellulosic molded bodies in the various layers being placed on top of one another and, possibly subsequently, hydroentangled.

BRIEF DESCRIPTION OF THE DRAWINGS

Hereinafter, the embodiments of the invention are described with reference to the drawings, wherein.

MODES OF CARRYING OUT THE INVENTION

Figure 1:
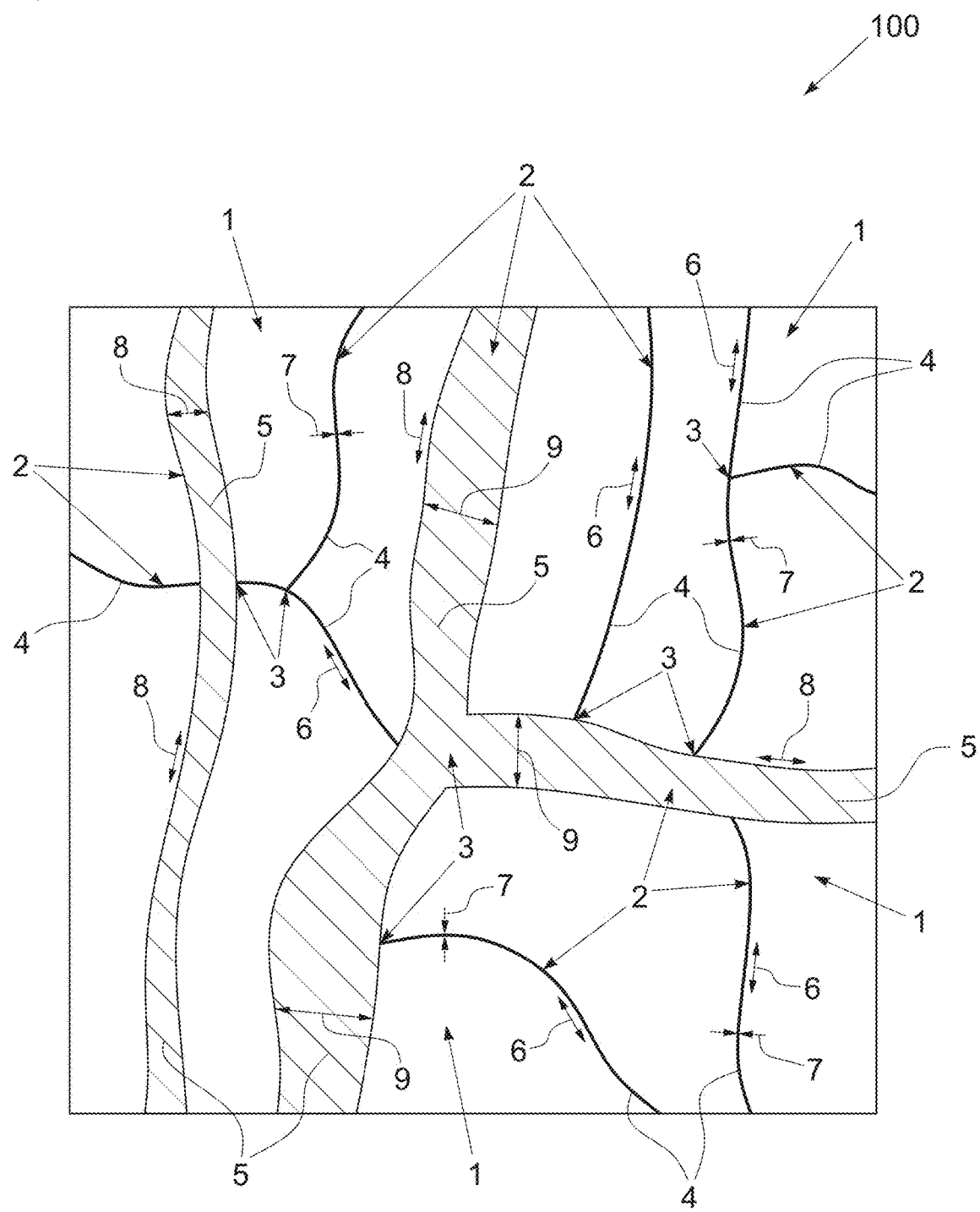
FIG. 1 is a schematic view of a first embodiment of the nonwoven according to the invention.

FIG. 1 is a schematic view of a nonwoven 100 according to a first embodiment, which includes a network 1 of regenerated cellulosic molded bodies 2. At node points 3, the molded bodies 2 are materially interconnected to form the network 1. In the network 1, the molded bodies 2 include monofilament sections 4 each of which extends between node points 3. Apart from the monofilament sections 4, the molded bodies 2 also include multifilament sections 5 which, like the monofilament sections 4, also extend between node points 3 or are interconnected via the node points 3 to form the network 1 of molded bodies 2. Here, the monofilament sections 4 can, at the node points 3, be alternatively connected to other monofilament sections 4 or to multifilament sections 5.

Figure 3:
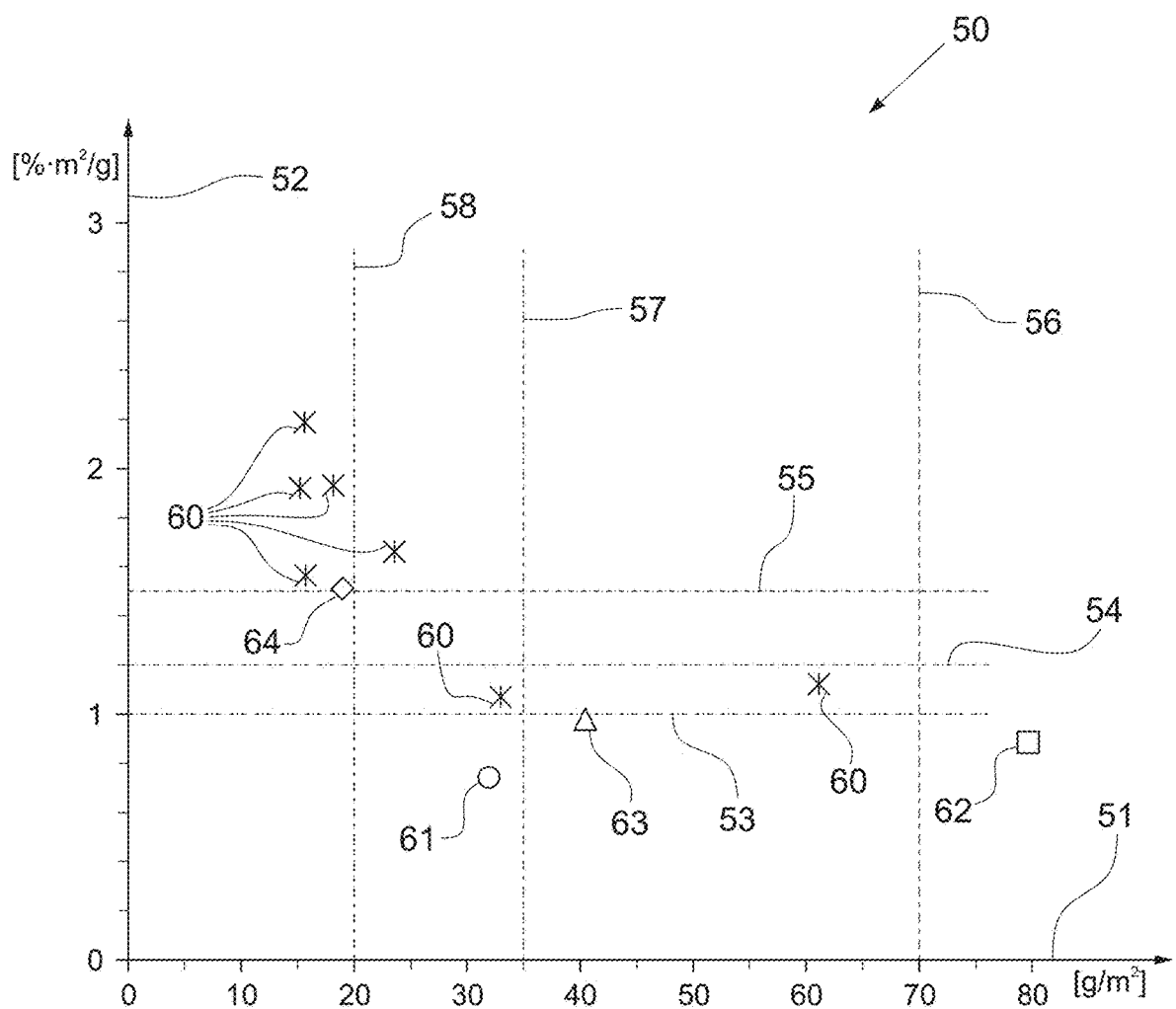
FIG. 3 is a scatter chart for the illustration of the specific opacity of the nonwovens according to the invention of Examples B1 to B7.

In the dry state, the nonwoven 100 has a specific opacity of greater than or equal to $1.0\% \cdot m^2/g$. In other embodiments, this specific opacity can be increased to up to $1.2\% \cdot m^2/g$, and more preferably to up to $1.5\% \cdot m^2/g$, depending on process parameters and basis weight range. FIG. 3, for example, shows a scatter chart 50 where the x-axis 51 represents the basis weight in $g/m^2$, and the y-axis 52 represents the specific opacity in $[\% \, m^2/g]$. Here, each of the straight lines 53, 54, and 55 represents the lower limit for a specific opacity of $1.0\% \cdot m^2/g$, $1.2\% \cdot m^2/g$, and $1.5\% \cdot m^2/g$, respectively. Here, each of the straight vertical lines 56, 57, and 58 stands for the limit values of the basis weight of 70 g/m 2, 35 g/m 2, and 20 $g/m^2$, respectively. Here, each of the measuring points 60 stands for an embodiment B1 to B7 of the present invention. Here, each of the measuring points 61, 62, 63, and 64 stands for the comparison measurements V1 to V4. In the description of the examples, the details of the measuring points 60 to 64 are explained more fully.

The monofilament sections 4 according to the embodiment in FIG. 1 have a variable, varying diameter 7 along their lengthwise extension 6. In this connection, the diameters 7 of the monofilament sections 4, at least along 90% of the lengthwise extension 6 of the monofilament sections 4, are no more than 15 µm. In this connection, the monofilament sections 4, along their lengthwise extension 6, have an average diameter 7 between 1 µm and 8 µm.

In another embodiment, the diameter 7 of the monofilament sections 4 can, for at least 90% of their lengthwise extension 6, be no more than 10 µm, and, in a particularly advantageous embodiment, be no more than 7 µm. Due to stretching of the extruded spinning solution in the blown air stream at a high velocity and a turbulent current, the molded bodies obtain a diameter 7 that varies along their lengthwise extension 6. Therefore, the multifilament sections 5 formed due to the connection of several filaments in the blown air stream also have a diameter 9 that varies along their lengthwise extension 8. In this connection, the multifilament sections 5 have a diameter of less than or equal to 100 µm for at least 90% of their lengthwise extension 8.

The multifilament sections 5 are formed as a result of the material connection of individual filaments in the blown air stream and thus are essentially composed of several monofilament sections 4 which intrinsically are inseparably connected with one another, via cohesion of the cellulose molecules. Therefore, the multifilament sections 5 are not to be regarded as a strand of parallel monofilament sections 4, but rather as one single multifilament section 5 caused to be created by the connection of several filaments.

Figure 2:
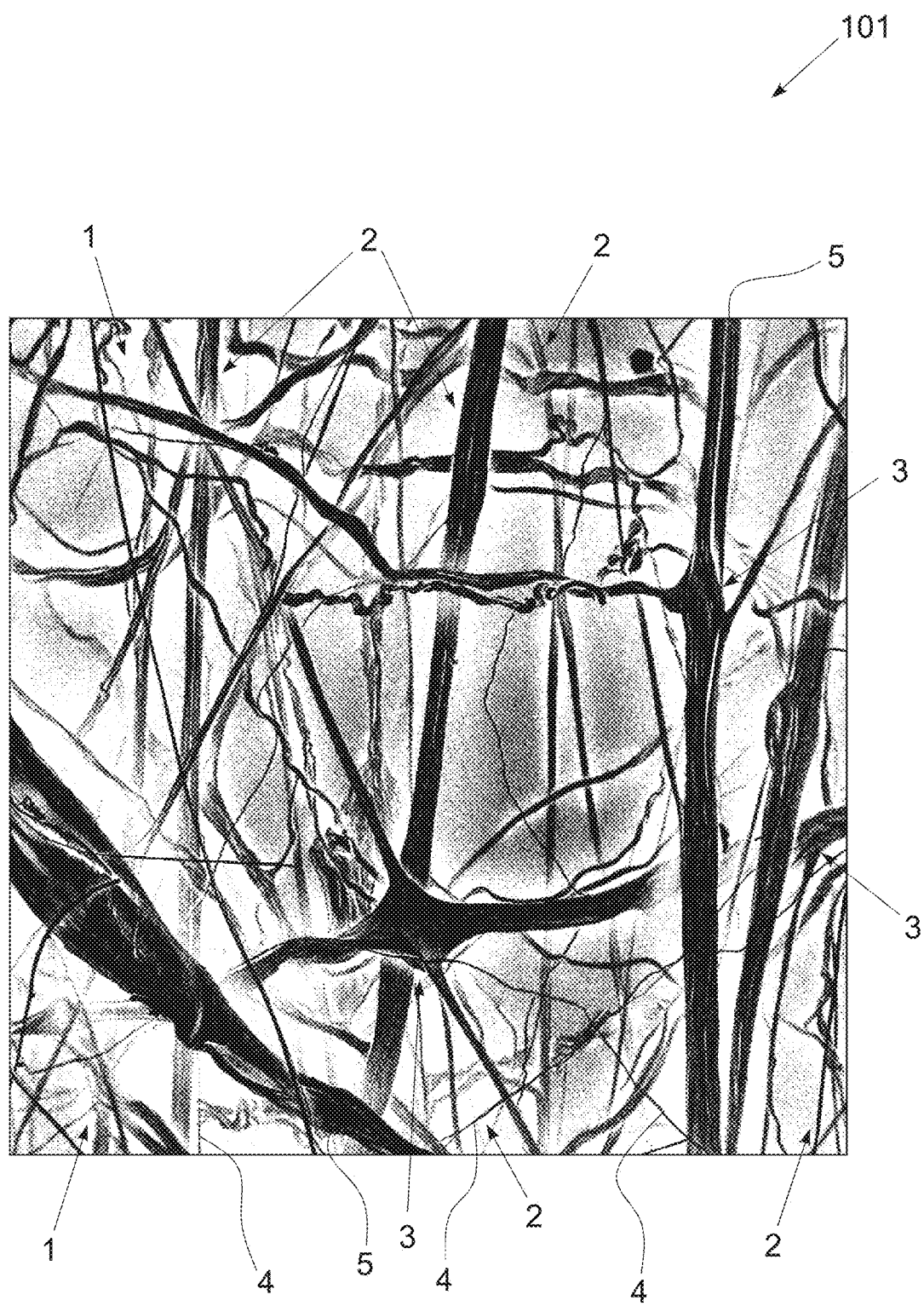
FIG. 2 is a microscopic image of another embodiment of the nonwoven according to the invention.

FIG. 2 is an electron microscope image at 250× magnification of a nonwoven 101 according to the invention. The nonwoven 101 includes, as previously described for FIG. 1, the network 1 of cellulosic molded bodies 2 that are connected via node points 3 and consist of monofilament sections 4 and multifilament sections 5.

The regenerated cellulosic molded bodies 2 in the nonwovens 100 and 101 according to FIGS. 1 and 2 form an endless network 1, wherein essentially no filament ends of the molded bodies 2 are visible. Due to the stretching process of the extruded spinning solution in the blown air stream, the individual filaments are materially connected to one another so that any ends of the filaments are connected to other filaments and form a node point 3. Thus, no loose filament ends can be identified, for example, in the microscopic image of the exemplary nonwoven 101 according to FIG. 2. However, it cannot be ruled out that, in further posttreatment steps of the nonwoven 100, 101—such as an additional hydroentangling process—filament ends are disengaged from the network 1 and thus will be present in a loose form in the nonwoven.

The molded bodies 2 of the nonwoven 101 are solution-spun cellulosic molded bodies 2 and were produced from a spinning solution containing cellulose, water, and NMMO according to the lyocell process. Once the cellulose has been precipitated and the nonwoven 101 has been washed, a nonwoven 101 according to the invention is obtained that, except for unavoidable impurities, consists only of cellulose. Furthermore, the nonwoven 101 includes no matting agents and colorants, which lends to it excellent strength and stability. In addition, the nonwoven 101 is free of adhesives or binders so that the mechanical flexibility of the nonwoven 101 is not adversely affected. Besides, the nonwoven 101 is well tolerated by skin, as it is free of metallic residues, especially copper and nickel.

In another embodiment, the nonwoven 100, 101 can include several interconnected layers, which, however, is not shown in detail in the figures. The connection of the layers can be materially via cohesion between the cellulose molecules of the molded bodies 2 or, for example, in a form-locking and/or force-locking manner by mechanical entanglement of the molded bodies 2—for example, as a result of a hydroentanglement process.

The nonwoven 100 according to the invention is particularly suitable for the production of a wipe 200, a face mask 300, and a dryer sheet 400, the nonwoven 100 having, in this case, a specific opacity of greater than or equal to 1.0% g m-2.

Figure 6:
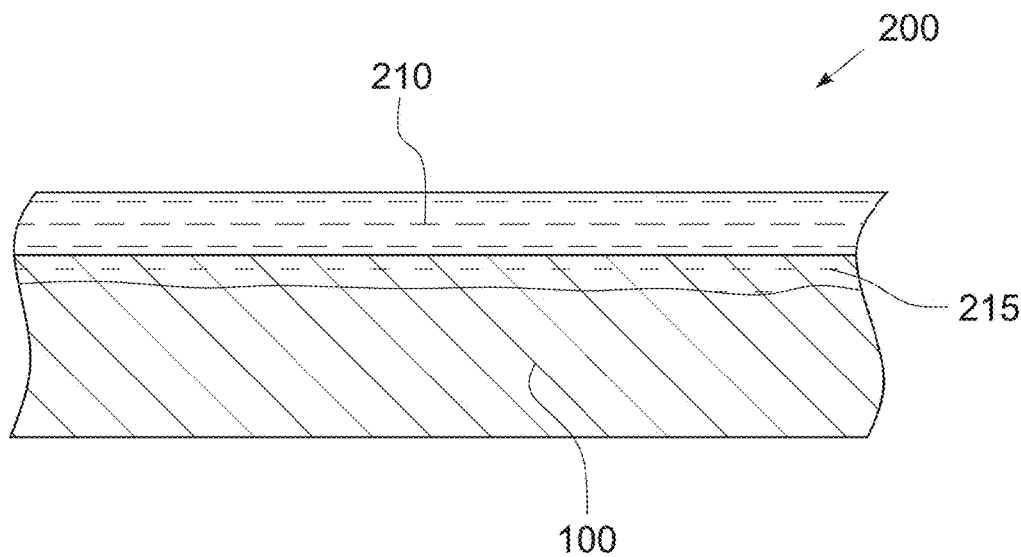
FIG. 6 a torn-off sectional view of a wipe.

FIG. 6, for example, shows a wipe 200 that includes an afore-described nonwoven 100 according to the invention. In this case, the nonwoven 100 is impregnated with a lotion 210 which penetrates at least partially into the nonwoven 100 and forms a penetration area 215. In this case, the lotion 210 can contain a solvent such as water, however, it is preferably oil-based, fat-based, or wax-based and thus essentially free of water. Such a wipe 200 can—depending on the lotion 210—be equally suited for hygiene use and the treatment of surfaces.

Figure 7:
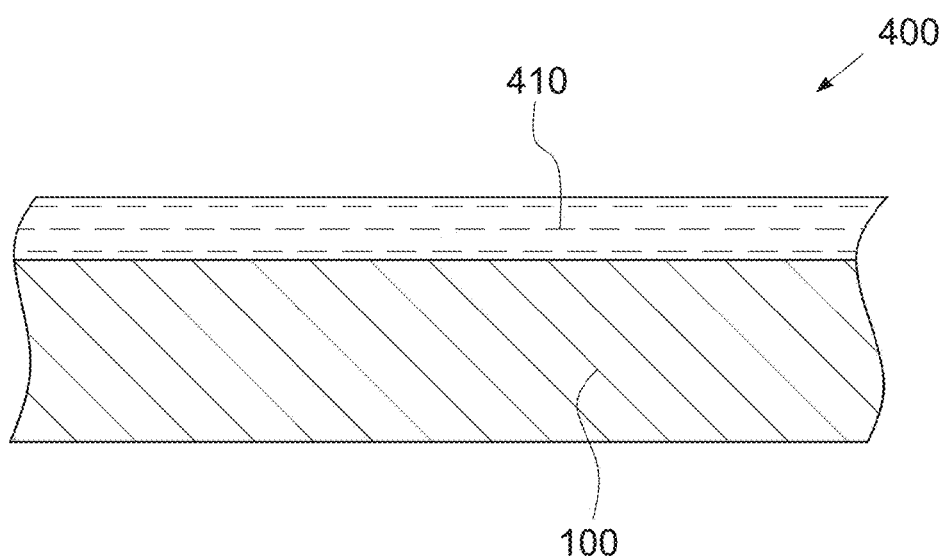
FIG. 7 a torn-off sectional view of a dryer sheet.

FIG. 7 shows a dryer sheet 400 which also includes a nonwoven 100 according to the invention. Again, a lotion 410 has been applied to the nonwoven 100. In this case, the lotion 410 can be absorbed by the structure of the nonwoven 100 and wet it, which, however, is not shown in detail in the figures. In particular, the nonwoven 100 can be fully or partially wetted by the lotion 410. Preferably, the lotion 400 is free of aqueous solutions and will, at elevated temperatures, for example, during a drying process in a laundry dryer, be released to the laundry contained therein.

Figure 8:
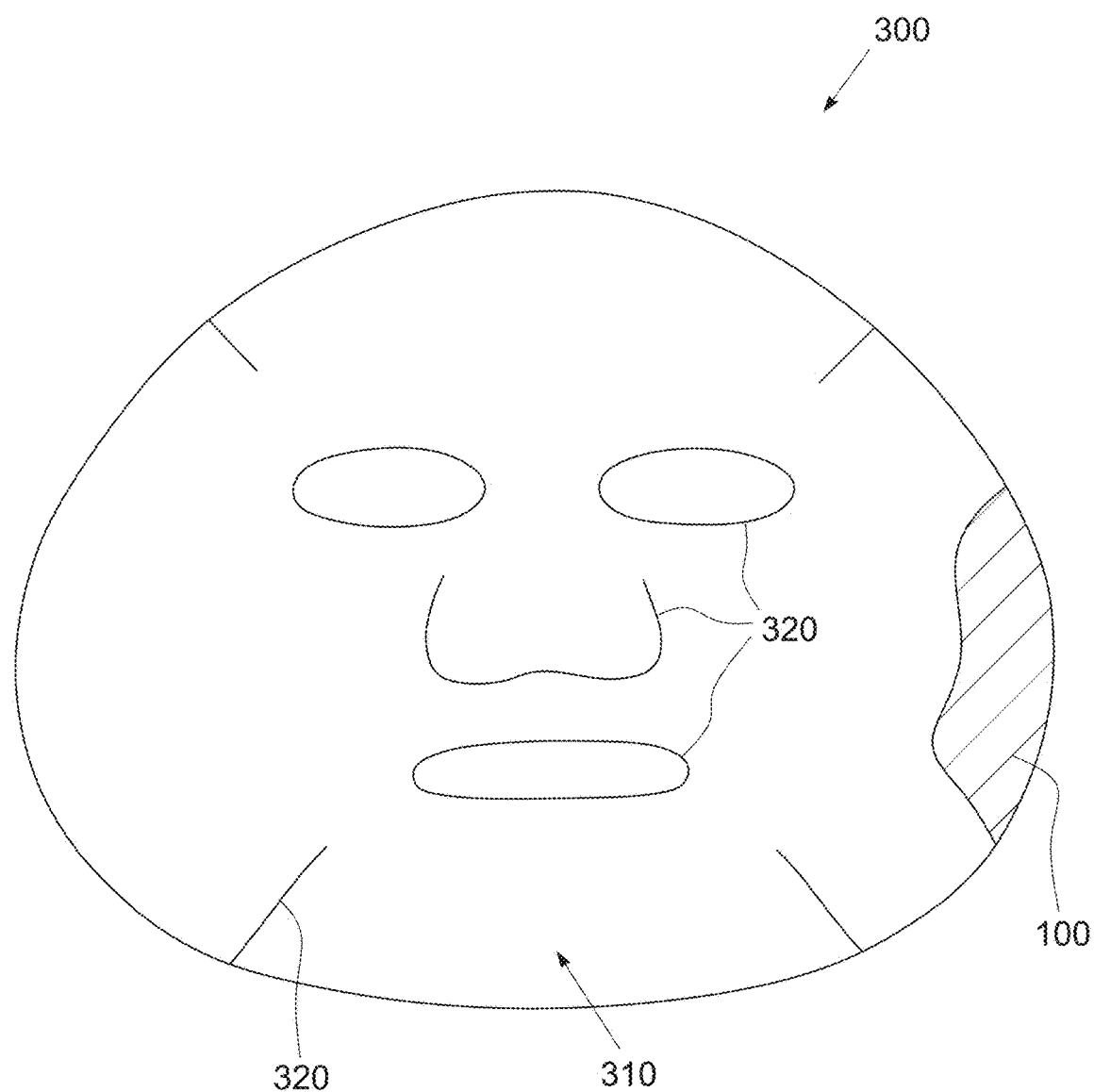
FIG. 8 a partially broken plan view of a face mask.

Lastly, FIG. 8 shows a face mask 300 which includes a nonwoven 100 as a base substrate and is, on its inner side (facing the face of the user), coated with a lotion 310. In this case, the lotion 310 is preferably configured such that it can be disengaged from the nonwoven 100 by the skin temperature of the user and be released toward the skin. In addition, the face mask 300 includes several cutouts 320 so as to conform readily to the face of the user.

Figure 4:
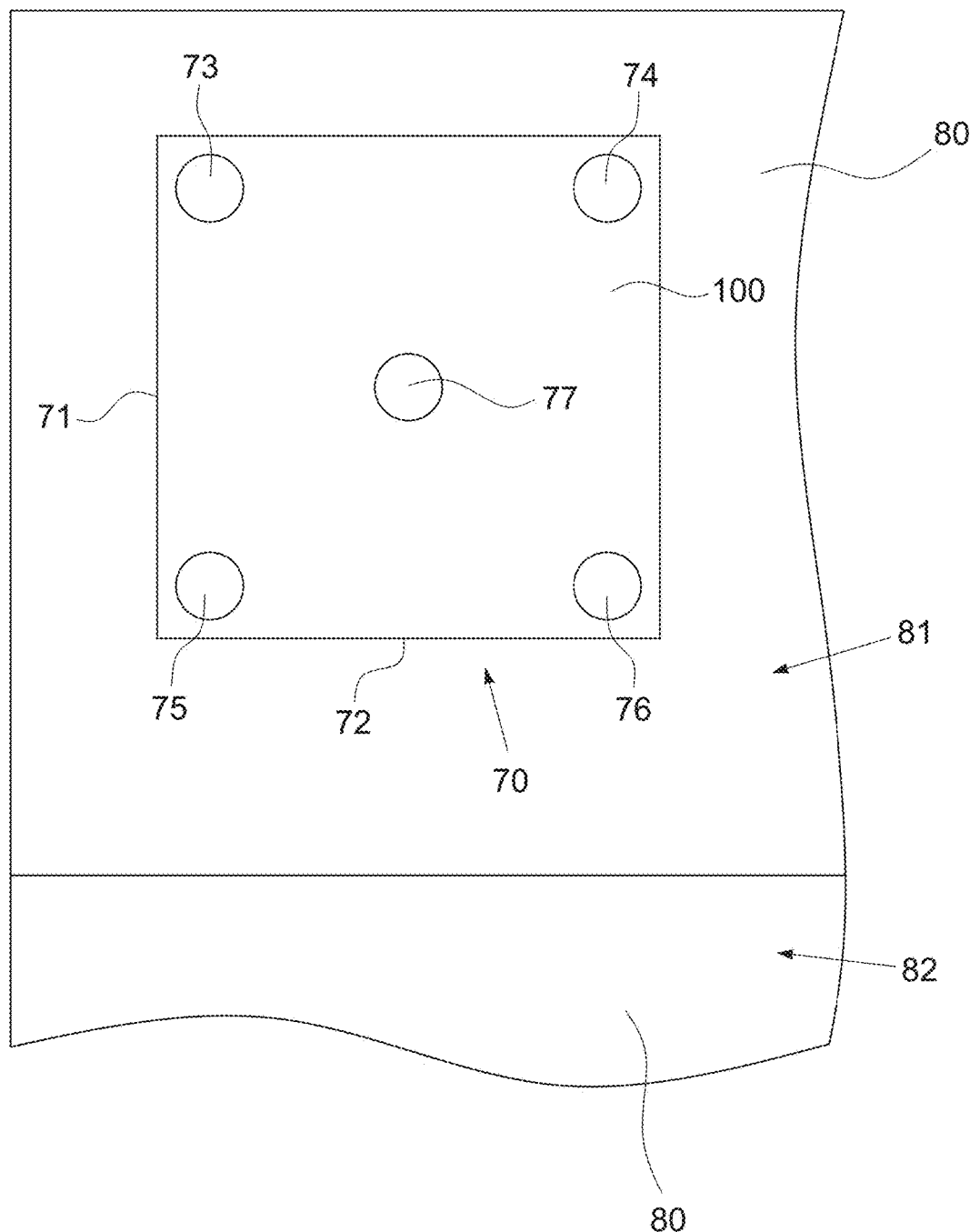
FIG. 4 is a schematic view of the measuring method used to determine the specific opacity.
Figure 5:
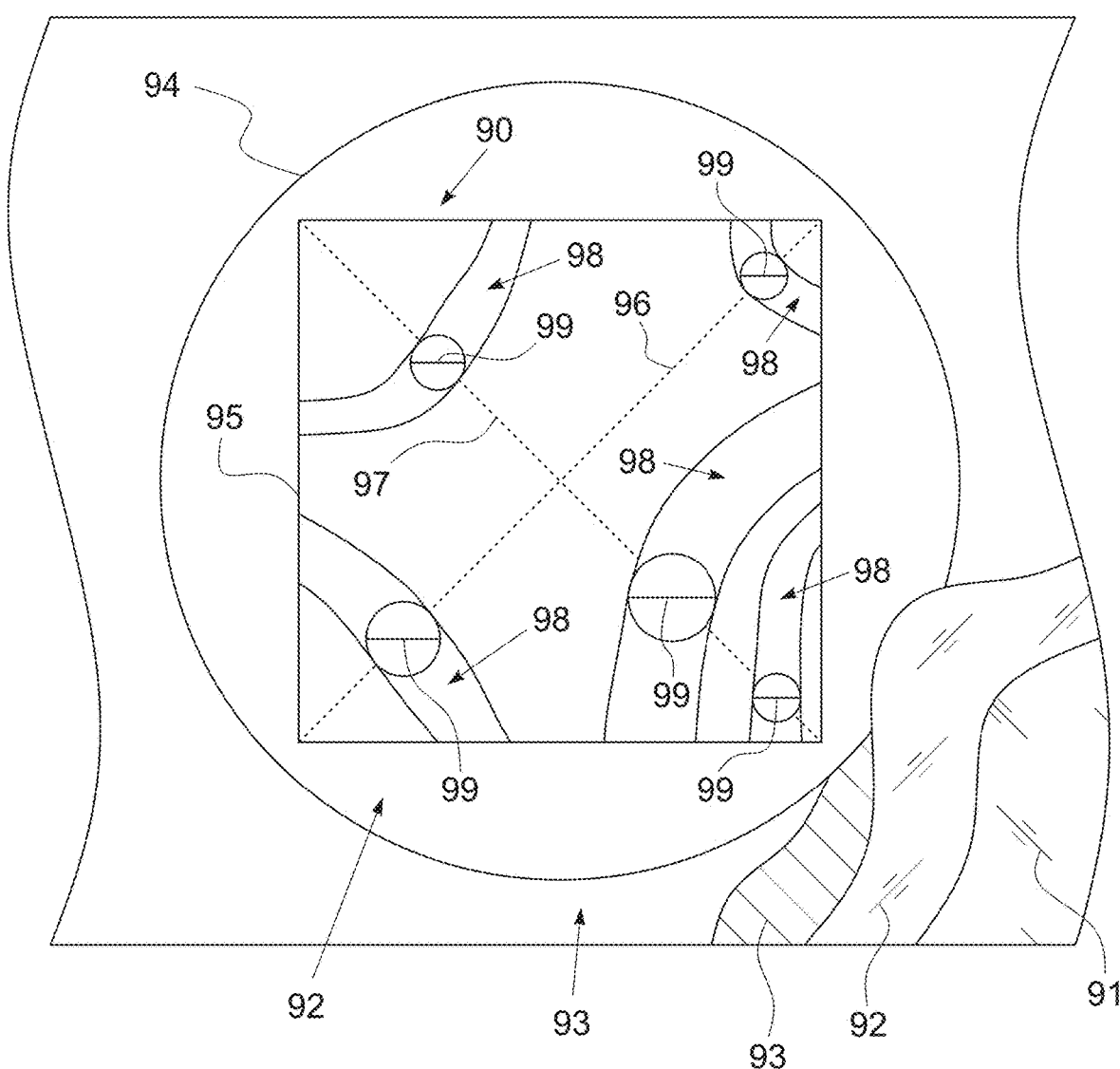
FIG. 5 a partially broken schematic plan view of a sample carrier for the determination of the diameters of the monofilament sections.

FIGS. 3, 4, and 5 are described hereinafter in order to explain the examples.

EXAMPLES

Measurement of Specific Opacity:

From the nonwoven to be analyzed, a 10×10 cm random sample is taken, and, prior to performing the measurement, conditioned for 24 hours at 23° C. (±2° C.) and 50% (±5%) relative air humidity. Following such conditioning, the sample is weighed, and the basis weight in g/m$^2$ is determined.

As the measuring instrument for all measurements, a Konica Minolta Inc. CM-600d spectrophotometer was equipped with a measuring head attachment for opacity measurements (Konica Minolta, not glazed, plastic, CM-A180 target mask 8 mm (w/o plate)), and the instrument was calibrated with the black standard (Konica Minolta Inc., CM-A182 Zero Calibration Box) as well as with the white standard (Konica Minolta Inc., CM-A177).

The measuring instrument settings and software used for all calibration measurements and opacity measurements are set forth in Table 1.

TABLE 1

| Measuring instrument setup for calibration and measurements | |
|---|---|
| Software | Konica Minolta Inc., Color Data Software CM-S100 w, SpectraMagicTM NX; Version: CM-S100w 2.70.0006 |
| Gloss component | SCE |
| Output | Reflection 570 nm |
| Measurement area | D = 8 mm |
| Illumination area | D = 11 mm |
| First light type | C |
| Second light type | (none) |
| Observer | 10° |

For the determination of the opacity, an opacity test chart with a black region and a white region is used (TQC Test Chart, Format A4, art. no. VF2345).

The reflection values of a sample are measured above both black and white regions of the opacity test chart. FIG. 4 shows a schematic view of a sample 70 removed from a nonwoven 100 according to the invention by cutting or stamping. The sample 70 has edge lengths 71, 72 of 10 cm. The positions 73, 74, 75, 76, and 77 where the measuring points 1 to 5 are recorded are in each of the corners and in the center of the sample 70.

At first, the sample 70 is positioned above the black region 81 of the opacity test chart 80, and the measuring points 1 to 5 for the reflection of the sample above black are determined. Subsequently, the sample 70 is positioned above the white region 82 of the opacity test chart 80, and recording the measuring points 1 to 5 is repeated for the reflection of the sample above white.

Then, the opacity of the sample for the measuring points 1, 2, 3, 4, and 5 can be calculated separately according to formula (2):

$$\text{opacity [\%]}=100\cdot\text{reflection above black/reflection above white,} \quad (2)$$

wherein reflection above black stands for the reflection of the sample above the black opacity test chart background at a wavelength of 570 nm and, in turn, reflection above white refers to the reflection of the sample above the white opacity test chart background at a wavelength of 570 nm.

Subsequently, the average value of the opacity values is calculated across all 5 measuring points and the specific opacity of the sample is determined according to Formula (1), as previously defined, as a division of the average value by the basis weight of the sample:

specific opacity [%·m²/g]=opacity [%]/basis weight [g/m²]. (1)

Here, the specific opacity stands for the opacity normalized per basis weight of the sample.

Microscopic Determination of the Diameters of the Monofilament Sections:

For determining the diameters of the monofilament sections, a 1 cm×1 cm random sample 90 was removed from the nonwoven and, before conducting the measurement, conditioned for 24 hours at 23° C. (±2° C.) and 50% (±5%) relative air humidity.

Subsequently, the sample 90 was, as shown in FIG. 5, placed on a transparent sample carrier 91 and covered with a cover glass 92. The cover glass 92 was weighted down with a metal frame 93 (having a mass of 62.6 g). The metal frame 93 has, in this case, a window 94 for viewing the sample 90 through the cover glass 92. Thus, a sample image will be recorded of the sample 90 in a light microscope in black/white transmitted light at 100× magnification.

A 1 mm×1 mm square 95 of the sample image is randomly selected, and two diagonals 96, 97 are drawn into this square 95. The monofilament sections 98 intersected by the diagonals 96, 97 down to a measuring depth of 150 μm are measured by determining an equivalence diameter 99 (through circle equivalence). For this purpose, the top side of the pressed-down nonwoven is defined as the zero point. Nonwovens that are thinner than 150 μm can thus be covered in their entire thickness by means of this method. If monofilament sections are cut at the corners of the square, their equivalence diameter 99 can still be measured completely by means of circle equivalence.

The described measuring method can be repeated at two other nonwoven locations, and the average value can be determined across all equivalence diameters 99 of the monofilament sections 98 of those nonwoven locations. Multifilament sections and node points are disregarded in the measurement.

DESCRIPTION OF THE EXAMPLES

Hereinafter, 7 examples (B1 to B7) of the nonwovens according to the invention will be shown.

The nonwovens (B1 to B7) mentioned as examples were produced according to a method comprising the following steps:

a lyocell spinning solution, including 10% cellulose, was prepared according to a known method described at the outset;

the spinning solution was extruded through closely adjacent openings of a spinneret arranged in series and was stretched in a blown air stream at a high velocity (for the process-technical details of the method, see the prior art mentioned at the outset);

during and/or after stretching, the cellulose was precipitated at least partially from the extruded spinning solution by applying a coagulant in order to form the molded bodies;

finally, the nonwoven was formed by placing the molded bodies onto a moving belt conveyor and subsequently washed and dried.

For demonstrating the advantageous characteristics according to the invention of the nonwovens produced in this way as regards their opacity, the blown air pressure (the velocity of the blown air stream) as well as the quantity of coagulation liquid were varied during the process as compared to a reference example (B4). It was possible to adapt the basis weight by specifically controlling the belt conveyor velocity. The parameters for the production of the examples B1 to B7 are summarized in Table 2.

TABLE 2

Production parameters for nonwovens according to the invention

| Example | Blown air pressure [compared to ref.] | Coagulation liquid [compared to ref.] | Basis weight [g/m²] | Specific opacity [% · m²/g] |
|---|---|---|---|---|
| B1 | 1 x | 0.25 x | 33.0 | 1.07 |
| B2 | 1 x | 0.50 x | 61.2 | 1.12 |
| B3 | 1 x | 0.75 x | 15.8 | 1.56 |
| B4 - Ref. | 1 x | 1.00 x | 23.6 | 1.66 |
| B5 | 2 x | 1.25 x | 15.2 | 1.92 |
| B6 | 2 x | 1.50 x | 18.2 | 1.93 |
| B7 | 2 x | 1.75 x | 15.6 | 2.19 |

The thus obtained examples B1 to B7 consist of 100% cellulose, that is, of regenerated lyocell molded bodies, each having a specific opacity greater than 1%·m²/g and a basis weight less than 70 g/m².

In general, it was found that by specifically controlling the blown air stream (particularly, the velocity of the blown air stream by changing the pressure), a variation of the diameter distribution in the monofilament sections was obtained, wherein higher blown air stream velocities or a higher blown air pressure led to greater stretching and thus finer average diameters of the monofilament sections. Also, by varying the quantity of coagulation liquid applied to the extruded spinning dope, it was possible to influence the formation of monofilaments and thus the specific opacity of the nonwoven. In this connection, an increase of the quantity of coagulation liquid brought about a higher content of monofilament sections, which in turn led to a higher specific opacity.

The parameters (air pressure and quantity of coagulation liquid) in Table 2 were specified as factors related to the reference example B4. Here, the reference parameters for the reference example B4 were determined by adjusting the production plant such that a nonwoven with an average basis weight of 25 g/m 2±10% and an average specific opacity of 1.6%·m²/g±10% was obtained.

The specific opacity of the nonwovens B1 to B7 was determined according to the above-described measuring method. The measured values determined in this process are shown in Table 3.

TABLE 3

Measured values for nonwovens according to the invention

| Example | Reflection black | Reflection white | Opacity [%] | Weight [g] | Basis weight [g/m²] | Specific opacity [% · m²/g] |
|---|---|---|---|---|---|---|
| B1 | 29.36 | 83.09 | 35.33 | 0.330 | 33.0 | 1.07 |
| B2 | 57.80 | 84.45 | 68.44 | 0.612 | 61.2 | 1.12 |

TABLE 3-continued

Measured values for nonwovens according to the invention

| Example | Reflection black | Reflection white | Opacity [%] | Weight [g] | Basis weight [g/m²] | Specific opacity [%·m²/g] |
|---|---|---|---|---|---|---|
| B3 | 20.35 | 82.82 | 24.57 | 0.158 | 15.8 | 1.56 |
| B4 | 32.46 | 83.06 | 39.08 | 0.236 | 23.6 | 1.66 |
| B5 | 24.23 | 82.88 | 29.23 | 0.152 | 15.2 | 1.92 |
| B6 | 29.19 | 83.22 | 35.08 | 0.182 | 18.2 | 1.93 |
| B7 | 28.34 | 82.98 | 34.16 | 0.156 | 15.6 | 2.19 |

Comparison Examples

In order to illustrate the advantageous characteristics of Examples B1 to B7, Table 4 shows Comparison Examples V1 to V4. The basis weight and the specific opacity of the comparison examples were determined according to the afore-described measuring method.

TABLE 4

Characteristics of the comparison examples

| Example | Material | Production method | Basis weight [g/m²] | Specific opacity [%·m²/g] |
|---|---|---|---|---|
| V1 | 100% polypropylene | carding, thermobonding | 32.0 | 0.74 |
| V2 | 100% lyocell | carding, hydroentangling | 79.7 | 0.88 |
| V3 | 100% cupro | spunbonding | 40.5 | 0.98 |
| V4 | 100% polyester | spunbonding | 19.0 | 1.51 |

Comparison Example V1 is a carded, thermobonded nonwoven of 100% polypropylene fibers of the Sawabond 4138 type obtained from Sandler AG. The nonwoven has a low basis weight of 32 g/m², however, exhibited low a specific opacity of only 0.74%·m²/g in the measurement.

Comparison Example V2 is a carded, hydroentangled nonwoven of 100% lyocell staple fibers obtained from Lenzing AG. The nonwoven has a comparatively high basis weight of 79.7 g/m², however, it still reaches a specific opacity of only 0.88%·m²/g.

Comparison Example V3 is a 100% cupro sponbonded nonwoven from Asahi Kasei Corp. of the Bemliese SE384G type. At a basis weight of 40.5 g/m², the spunbond is able to reach a specific opacity of only 0.98%·m²/g.

Comparison Example V4 shows a 100% polyester spunbonded nonwoven of the Reemay 2250 type from Berry Global Inc. The polyester spunbonded nonwoven exhibits excellent specific opacity of 1.51%·m²/g at a low basis weight of 19.0 g/m².

In the scatter chart 50 of FIG. 3, the Comparison Examples V1 to V4 are shown as measured values 61, 62, 63, and 64, respectively, and related to the measured values 60 of the inventive Examples B1 to B7.

What is claimed is:

1. A nonwoven, comprising a network of molded bodies, the nonwoven in the dry state, having a specific opacity of greater than or equal to 1.0%·m²/g, wherein the molded bodies are regenerated cellulosic molded bodies and are materially interconnected via node points to form the network, wherein the regenerated cellulosic molded bodies comprise monofilament sections extending between node points, whose diameter varies along their lengthwise extension and which have a diameter of less than or equal to 15 µm for at least 90% of their lengthwise extension, and wherein the regenerated cellulosic molded bodies comprise multifilament sections extending between node points and being formed of two or more monofilament sections that are essentially parallel and that are connected with one another via cohesion of cellulose molecules, the multifilament sections having a diameter of less than or equal to 100 µm for at least 90% of their lengthwise extension.

2. The nonwoven of claim 1, wherein the regenerated cellulosic molded bodies form an essentially endless network without visible filament ends.

3. The nonwoven of claim 1, wherein the nonwoven is essentially free of matting agents and colorants.

4. The nonwoven of claim 1, wherein the nonwoven consists essentially of cellulose.

5. The nonwoven of claim 1, wherein the regenerated cellulosic molded bodies are solution-spun cellulosic molded bodies.

6. The nonwoven of claim 5, wherein the monofilament sections have a solid cross-section.

7. The nonwoven of claim 1, wherein the nonwoven is essentially free of binders or adhesives.

8. The nonwoven of claim 1, wherein the nonwoven is essentially free of copper and/or nickel.

9. The nonwoven of claim 8, wherein the nonwoven has a copper content of less than 5 ppm and/or a nickel content of less than 2 ppm.

10. The nonwoven of claim 1, wherein the monofilament sections have a diameter of less than or equal to 10 µm for at least 90% of their lengthwise extension.

11. The nonwoven of claim 1 wherein the monofilament sections have an average diameter of greater than or equal to 1 µm and less than or equal to 8 µm.

12. The nonwoven of claim 1, wherein the nonwoven in the dry state, has a specific opacity of greater than or equal to 1.2%·m²/g.

13. The nonwoven of claim 1, wherein the nonwoven has a basis weight of less than or equal to 70 g/m².

14. The nonwoven of claim 1, wherein the nonwoven comprises at least one of a property-refining substance, a surface-refining substance, a property-changing substance, a surface-changing substance and processing-facilitating agents at a content of no more than 1% by weight.

15. The nonwoven of claim 1, wherein the network of regenerated cellulosic molded bodies comprises several interconnected layers.

16. A nonwoven of claim 1 for use in hygiene products filters, industrial products, clothing, furnishings, automotive, or leisure products.

17. A wipe comprising the nonwoven of claim 1.

18. The wipe of claim 17, wherein the nonwoven is impregnated with a lotion.

19. The wipe of claim 18, wherein the lotion is essentially non-water-based.

20. The nonwoven of claim 5, wherein the solution-spun cellulosic molded bodies are produced according to a lyocell process.

21. The nonwoven of claim 6, wherein the monofilament sections have a round cross-section.

22. The nonwoven of claim 10, wherein the monofilament sections have a diameter of less than or equal to 7 µm for at least 90% of their lengthwise extension.

23. The nonwoven of claim 12, wherein the nonwoven in the dry state has a specific opacity of greater or equal to 1.5%·m²/g.

24. The nonwoven of claim 13, wherein the nonwoven has a basis weight of less than or equal to 35 g/m².

25. The nonwoven of claim 24, wherein the nonwoven has a basis weight less than or equal to 20 g/m².

26. The nonwoven of claim 14, wherein the nonwoven comprises at least one of a property-refining substance, a surface-refining substance, a property-changing substance, a surface-changing substance and processing-facilitating agents at a content of no more than 0.5% by weight.

27. A face mask comprising the nonwoven claim 1.

28. The face mask of claim 27, wherein the nonwoven is impregnated with a lotion.

29. The face mask of claim 28, wherein the lotion is essentially non-water-based.

30. A dryer sheet comprising the nonwoven claim 1.

31. The dryer sheet of claim 30, wherein the nonwoven is impregnated with a lotion.

32. The dryer sheet of claim 31, wherein the lotion is essentially non-water-based.

* * * * *